United States Patent
Wechs et al.

(10) Patent No.: US 7,811,507 B2
(45) Date of Patent: Oct. 12, 2010

(54) DIALYSIS MEMBRANE HAVING IMPROVED ABILITY FOR REMOVAL OF MIDDLE MOLECULES

(75) Inventors: Friedbert Wechs, Worth (DE); Arne Gehlen, Taufkirchen (DE); Bodo Von Harten, Wuppertal (DE); Richard Kruger, Wuppertal (DE); Oliver Schuster, Schwelm (DE)

(73) Assignee: Membrana GmbH, Wuppertal (DE)

( * ) Notice: Subject to any disclaimer, the term of this patent is extended or adjusted under 35 U.S.C. 154(b) by 659 days.

(21) Appl. No.: 10/588,696

(22) PCT Filed: Feb. 15, 2005

(86) PCT No.: PCT/EP2005/001483

§ 371 (c)(1),
(2), (4) Date: Aug. 8, 2006

(87) PCT Pub. No.: WO2005/082505

PCT Pub. Date: Sep. 9, 2005

(65) Prior Publication Data

US 2007/0163949 A1  Jul. 19, 2007

(30) Foreign Application Priority Data

Feb. 19, 2004  (DE) ................. 10 2004 008 221

(51) Int. Cl.
*B01D 63/02* (2006.01)
*B29C 39/14* (2006.01)

(52) U.S. Cl. ............ 264/562; 210/500.23; 210/500.43; 210/500.27; 210/490; 210/500.21; 210/500.22; 210/500.41; 210/500.42; 264/41; 264/48; 264/49; 264/561; 264/233; 428/398

(58) Field of Classification Search ............ 210/500.23, 210/500.27, 500.42, 500.21, 500.22, 500.43, 210/490, 500.41; 264/41, 48, 49, 561, 562, 264/233; 428/398

See application file for complete search history.

(56) References Cited

U.S. PATENT DOCUMENTS

| 4,906,375 | A | * | 3/1990 | Heilmann ............... 210/500.23 |
| 5,246,582 | A |   | 9/1993 | Sluma et al. |
| 5,290,448 | A | * | 3/1994 | Sluma et al. ........... 210/500.23 |
| 5,290,488 | A |   | 3/1994 | Arai et al. |
| 5,476,715 | A | * | 12/1995 | Otto ........................... 428/407 |
| 5,505,859 | A |   | 4/1996 | Dunweg et al. |
| 5,683,584 | A |   | 11/1997 | Wenthold et al. |
| 6,565,782 | B1 | * | 5/2003 | Wang et al. .................... 264/41 |

(Continued)

FOREIGN PATENT DOCUMENTS

EP  0168783 A1  1/1986

(Continued)

*Primary Examiner*—Krishnan S Menon
*Assistant Examiner*—Marjorie Christian
(74) *Attorney, Agent, or Firm*—Hammer & Associates, P.C.

(57) ABSTRACT

A hydrophilic semipermeable hollow-fibre membrane for blood treatment, with an integrally asymmetric structure based on a synthetic polymer. The hollow-fiber membrane possess on its inner surface a separating layer and an adjoining open-pored supporting layer, and has an ultrafiltration rate in albumin solution of 5 to $\leq 25$ ml/(h·m²·mmHg). The hollow fiber membrane is free from pore-stabilizing additives and has a maximum sieving coefficient for albumin of 0.005 and a sieving coefficient of cytochrome c that satisfies the equation $$SCcc \geq 5 \cdot 10^{-5} \cdot UFR_{Alb}^3 - 0.004 \cdot UFR_{Alb}^2 + 0.1081 \cdot UFR_{Alb} - 0.25.$$

9 Claims, 1 Drawing Sheet

U.S. PATENT DOCUMENTS

2008/0000828 A1 * 1/2008 Wechs et al. ................ 210/496

FOREIGN PATENT DOCUMENTS

| EP | 305787 | A1 | 3/1989 |
| EP | 344581 | A2 | 12/1989 |
| EP | 0716859 | A2 | 6/1996 |
| EP | 828553 | | 11/1996 |
| EP | 750938 | A1 | 1/1997 |
| EP | 0824960 | A1 | 2/1998 |
| EP | 0997182 | A1 | 5/2000 |
| JP | 0409727 | * | 3/1992 |
| JP | 04094727 | | 8/1992 |

* cited by examiner

DIALYSIS MEMBRANE HAVING IMPROVED ABILITY FOR REMOVAL OF MIDDLE MOLECULES

DESCRIPTION

The invention relates to a hydrophilic, water-wettable, semipermeable hollow-fibre membrane based on a synthetic first polymer, in particular for hemodialysis or conventional hemodiafiltration with low exchange volumes, the membrane possessing an open-pored, integrally asymmetric structure across its wall, a porous separating layer of thickness between 0.1 and 2 μm on its inner surface facing the lumen, and an open-pored supporting layer adjoining the separating layer, and having an ultrafiltration rate in albumin solution in the range of 5 to 25 ml/(h·m²·mmHg). The invention further relates to a method for the production of such a membrane.

Membranes, mainly based on cellulosic polymers, have been used for many years in the conventional treatment of patients with chronic kidney failure. These membranes have relatively low ultrafiltration rates, and during hemodialysis remove by diffusion mechanisms essentially only low-molecular uremic toxins, i.e., they possess a low exclusion limit, which allows elimination of substances of molecular weight up to about 5000 daltons.

In the last few years, however, efforts have increasingly been directed at removing especially what are known as middle molecules, and specifically low-molecular proteins such as $\beta_2$-microgbulin ($\beta_{2M}$), from the blood to be treated during hemodialysis, in addition to the low-molecular kidney-targeted substances, i.e. uremic toxins and/or uremic markers such as urea, creatinine and phosphate. A large number of investigations have shown that low-molecular proteins cause complications during dialysis. Accumulation of $\beta_{2M}$ in the blood, for example, is regarded as a cause of amyloidosis and carpal tunnel syndrome. However, middle molecules of this type cannot be efficiently removed by diffusion mechanisms, and efforts are therefore being made to increase the permeability of the membranes to low-molecular proteins. In the last few years, in particular high-flux dialysis membranes, i.e. dialysis membranes with high ultrafiltration rates for water that are suitable for high-flux hemodialysis, hemodiafiltration and hemofiltration, have been developed for this purpose. In blood-treatment applications of this type, the removal of large quantities of water from the patient's bloodstream is essential. At the same time, these membranes allow convective removal of so-called middle molecules, whereby, as a result of increased permeability to low-molecular proteins, the risk often exists of increased loss of valuable blood components such as albumin. It is therefore attempted to attain sieving coefficients for the low-molecular proteins that are as high as possible and in the ideal case approach the maximum value of 1. The sieving coefficients for albumin, on the other hand, should be as low as possible.

In the area of diffusion-controlled hemodialysis with low ultrafiltration rates the membranes used are for the most part based on cellulosic polymers, but in the area of high-flux hemodialysis, and also for hemodiafiltration and hemofiltration, primarily synthetic polymers such as polyamides, polyvinyl alcohols, ethylene vinyl alcohol copolymers, polyether polyamide block copolymers and increasingly, on account of their outstanding physico-chemical properties, engineering plastics such as aromatic sulfone polymers, polyphenylene sulfides, polyetherimides and polyether ketone, have been investigated and used as membrane material for hollow-fibre membranes over the last few years.

Membranes of this type are described in, for example, EP 305 787.

The membranes of EP 305 787 are constructed from a hydrophobic first polymer and a hydrophilic second polymer, and have an asymmetric structure. Having ultrafiltration rates for water that exceed 250 ml/(h·m²·mmHg), they are suitable for use in high-flux dialysis up to hemofiltration. The pore structures of the membranes of EP 305 787 are stabilised with a glycerol-water mixture, and the membranes then have sieving coefficients for albumin of about 0.001 and for $\beta_{2M}$ of 0.6 to 0.8. The membranes have a structure composed of three layers with a separating layer in the form of a dense and relatively thin skin, an underlying layer with a spongy structure, and, adjoining this, a third layer with a structure having large, finger-shaped pores.

EP 344 581 describes membranes for blood treatment without finger pores and without asymmetric pore sizes, which have ultrafiltration rates of 635 ml/(h·m²·mmHg) and above, and allow the removal of toxins such as $\beta_{2M}$ and retention of useful components such as albumin with high efficiency. The membranes of EP 344 581 consist of a mixture of a polyarylate and a polysulfone, and have a homogeneous and uniform fibrillated structure across the membrane cross-section. The membranes disclosed in EP 344 581 are hydrophobic and, according to EP 344 581, must either be treated with glycerol before drying, or initially rinsed with, for example, an alcohol, which is then substituted by water.

EP 750 938 also refers to membranes for the high-flux region, i.e. membranes that with ultrafiltration rates for water preferably exceeding 500 ml/(h·m²·mmHg) possess very high permeability to water. The membranes of EP 750 938 have very low albumin permeabilities and high removal rates for the low-molecular protein β2-microglobulin. EP 824 960 also has as its object membranes with high ultrafiltration rates for water and improved permeability to $\beta_2$-microglobulin.

However, in the above-mentioned high-flux membranes, i.e. dialysis membranes with high ultrafiltration rates exceeding about 250 ml/(h·m²·mmHg), the risk often exists of strong flow-rate fluctuations in application, which particularly impact older patients. Also associated with high-flux dialysis membranes is the risk of possible back-filtration arising from negative transmembrane pressure in parts of the dialysers, with the result that pyrogen-contaminated dialysate can pass over to the blood side, leading to dangerous reactions in patients, particularly those on long-term dialysis. Finally, in several blood-purification applications, slow and gentle reduction of the proportion of water in the blood and slow removal of kidney-targeted substances from the blood is considered advantageous.

The need therefore exists for hollow-fibre membranes for blood purification with moderate ultrafiltration rates below the high-flux region, i.e. ultrafiltration rates for water lying below about 200 to 250 ml/(h·m²·mmHg), or ultrafiltration rates in albumin solution in the range between 5 and 25 ml/(h·m²·mmHg). In these membranes, however, the permeability to low-molecular proteins has been shown to depend on the ultrafiltration rate. If the ultrafiltration rates of the membranes are reduced, the sieving coefficients attained for low-molecular proteins are also significantly reduced. This is verified also by, e.g., the relationships described in EP 828 553.

EP 828 553 discloses integral, multi-asymmetric membranes made from polymers soluble in ε-caprolactam, for use in hemodialysis, hemodiafiltration or hemofiltration. The membranes of EP 828 553 have a three-layer structure with a thin separating layer, an adjoining sponge-like, large-pored supporting layer without finger pores, and a third layer, adjoining the supporting layer, in which the pore size is smaller than in the supporting layer and which determines the hydraulic permeability of the membrane. According to the examples in EP 828 553, sieving coefficients of up to 0.8 are indeed obtained for cytochrome c, which has a molecular weight of 12500 daltons and is often used as a marker molecule for $\beta_2$-microglobulin, for membranes in the high-flux region, i.e. with ultrafiltration rates for water lying above approx. 250 ml/(h·m²·mmHg). In example 13, EP 828 553 discloses, for a high-flux membrane of this type with an ultrafiltration rate for water of 600 ml/(h·m²·mmHg), corresponding to an ultrafiltration rate for albumin of 50 ml/(h·m²·mmHg), a sieving coefficient for cytochrome c of 0.75, combined with a sieving coefficient for albumin of 0.05. For membranes with low- to mid-range ultrafiltration rates, i.e. with an ultrafiltration rate for water lying below 250 to 300 ml/(h·m²·mmHg) and an ultrafiltration rate for albumin below approx. 25 ml/(h·m²·mmHg), the maximum sieving coefficients obtained for cytochrome c, which depend on the ultrafiltration rate, are 0.37 in the low-flux region, and 0.58 for mid-range ultrafiltration rates, i.e. in the mid-flux region with an ultrafiltration rate for water exceeding approx. 150 to 200 ml/(h·m²·mmHg).

EP 997 182 has as its object hollow-fibre membranes for blood purification with a separating layer on the lumen-facing surface, which are based on polysulfones and contain polyvinylpyrrolidone and other substances for hydrophilisation. In the examples of EP 997 182, hollow-fibre membranes are described, which have ultrafiltration rates for water in the range of 165 to approx. 200 ml/(h·m²·mmHg) and for which, depending on the nature of the membrane, ultrafiltration rates in albumin solution exceeding approx. 15 ml/(h·m²·mmHg) can be assumed, that find application in conventional hemodiafiltration with low exchange volumes, although not in low-flux hemodialysis. These membranes, which have been treated during production with an aqueous glycerol/water solution to stabilise the pore structure, show in the cited ultrafiltration range small sieving coefficients for albumin while the sieving coefficients for $\beta_2$-microglobulin are up to approx. 0.65.

EP 716 859 discloses membranes with a homogeneous membrane structure, i.e. one without asymmetry over the cross-section of the wall. The membranes are based on, for example, polysulfone, polyethersulfone, or polyarylsulfone, to which a hydrophilic polymer such as polyvinylpyrrolidone or polyethylene glycol has been added to increase the hydrophilicity of the membranes. The membranes of EP 716 859 are impregnated with a glycerol solution after coagulation and before drying, to preserve the membrane structure during the drying process. According to the examples, sieving coefficients for albumin lower than 0.01 are indicated for the membranes so produced. For small filtrate flow rates of 10 ml/min, sieving coefficients of up to 0.88 can be attained for $\beta_{2M}$. The ultrafiltration rates of these membranes for blood, which are of the same order of magnitude as ultrafiltration rates in albumin solution, lie in the range between 16.5 and 25 ml/(h·m²·mmHg). A disadvantage frequently observed in homogeneous membranes, in which the entire membrane structure participates in filtration, is the risk of clogging of the pore structure by the components that are to be removed from the blood. This risk can be reduced by treating the membrane with glycerol or similar substances, so that impregnation of membranes of this type with, e.g., glycerol is necessary also for this reason.

The membranes described in the state of the art that are based on synthetic polymers are not wettable with aqueous media if the polymer constituting the membrane consists solely of a hydrophobic polymer. As a result, they either must not be completely dried, or must be filled with a pore-stabilising liquid such as glycerol or a polyethylene glycol to make them wettable and to stabilise the membrane structure. In the absence of such stabilisation, the permeability of the membrane is successively reduced with each drying operation, and the separation characteristics of the membrane are changed. Even the membranes known from the state of the art that contain a hydrophilic polymer component in addition to a membrane-forming hydrophobic polymer to ensure adequate water-wettability of the membrane are provided with a pore-filler to ensure stabilisation of the membrane characteristics during drying and at least significant permeability to middle molecules or low-molecular proteins. In the absence of such stabilisation the permeability of the membranes to middle molecules or low-molecular proteins is inadequate. However, membranes provided with a pore stabiliser give rise to disadvantages in downstream processing and in application.

The object of the present invention is to provide hollow-fibre membranes suitable for blood purification with an ultrafiltration rate in albumin solution below 25 ml/(h·m²·mmHg) that have improved separation behaviour as compared with state-of-the-art membranes, so as to enable in particular efficient removal of low-molecular proteins from the blood to be treated, with simultaneous high retention of valuable blood components. With these ultrafiltration rates, the membranes should be suitable for conventional hemodialysis or conventional hemodiafiltration, i.e. for hemodiafiltration applications with low exchange volumes in the range of approx. 4 to 12 liters per treatment. Moreover, the membranes should possess high mechanical stability, show stable performance characteristics even after drying and allow unproblematic production of dialysers containing these hollow-fibre membranes, and should not require pore stabilisers to stabilise the membrane structure during drying.

It is a further object of the invention to provide a process for producing hollow-fibre membranes of this type.

Figure 1:
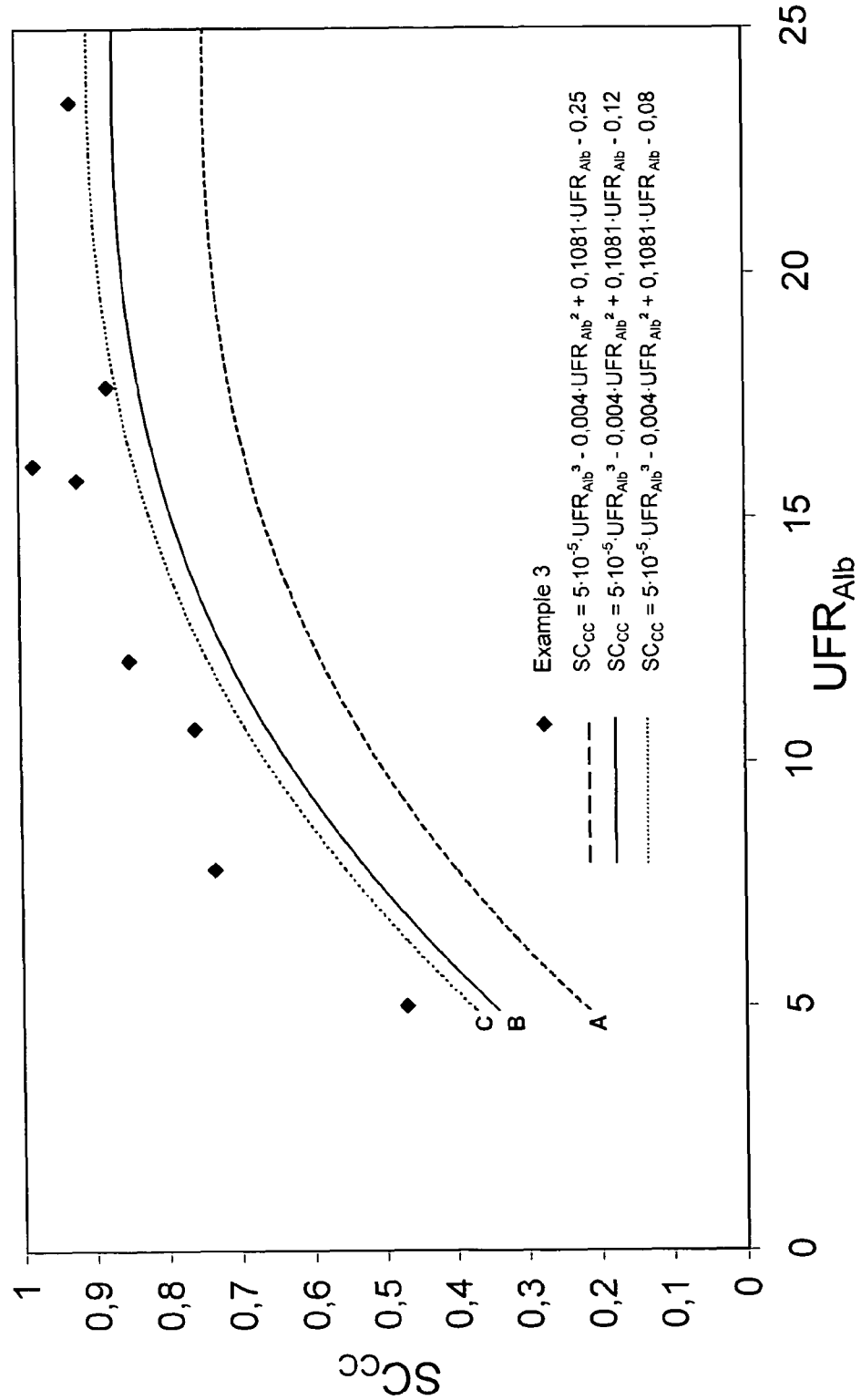
FIG. 1 is a graph of the sieving coefficient for cytochrome c as a function of the ultrafiltration rate in albumin solution.

The object of the invention is achieved firstly by a hydrophilic, water-wettable, semipermeable hollow-fibre membrane based on a synthetic first polymer, particularly for hemodialysis or low-volume hemodiafiltration, that possesses an open-pored integrally asymmetric structure across its wall, a porous separating layer of thickness 0.1 to 2 µm on its inner surface facing the lumen, and an open-pored supporting layer adjoining the separating layer, and having an ultrafiltration rate in albumin solution, $UFR_{Alb}$, in the range of 5 to 25 ml/(h·m²·mmHg), this hollow-fibre membrane being characterised in that, in the absence of additives that stabilise the pores in the membrane wall, and after prior drying, it has a sieving coefficient for albumin, $SC_{Alb}$, with a maximum value of 0.005, combined with a sieving coefficient for cytochrome c, $SC_{CC}$, that satisfies equation (1):

$$SC_{CC} \geq 5 \cdot 10^{-5} \cdot UFR_{Alb}^3 - 0.004 \cdot UFR_{Alb}^2 + 0.1081 \cdot UFR_{Alb} - 0.25 \quad (1)$$

The object of the invention is further achieved by a method for producing these hollow-fibre membranes, comprising the following steps:

a. preparing a homogeneous spinning solution comprising 12 to 30 wt. % of a synthetic first polymer and, if necessary, other additives in a solvent system, b. extruding the spinning solution through the annular slit of a hollow-fibre die to give a hollow fibre, c. extruding an interior filler through the central opening of the hollow-fibre die, the interior filler being a coagulation medium for the synthetic first polymer and comprising a solvent and a non-solvent for the synthetic first polymer, d. bringing the interior filler into contact with the inner surface of the hollow fibre, to initiate coagulation in the interior of the hollow fibre and for formation of a separating layer on the inner surface of the hollow fibre and formation of the membrane structure, e. passing the hollow fibre through a coagulation bath, to complete the formation of the membrane structure if necessary, and to fix the membrane structure, f. extracting the hollow-fibre membrane thus formed, to remove the solvent system and soluble substances, and g. drying the hollow-fibre membrane, the method being characterised in that the interior filler contains a polyelectrolyte with negative fixed charges, as a result of which a hollow-fibre membrane is obtained with an ultrafiltration rate in albumin solution, $UFR_{Alb}$, in the range of 5 to 25 ml/(h·m²·mmHg) and a maximum sieving coefficient for albumin of 0.005 combined with a sieving coefficient for cytochrome c, $SC_{CC}$, that satisfies equation (1):

$$SC_{CC} \geq 5 \cdot 10^{-5} \cdot UFR_{Alb}^3 - 0.004 \cdot UFR_{Alb}^2 + 0.1081 \cdot UFR_{Alb} - 0.25 \quad (1)$$

The ultrafiltration rate for these membranes in albumin solution lies preferably in the range of 10 to 25 ml/(h·m²·mmHg) and especially preferably in the range of 12 to 25 ml/(h·m²·mmHg).

The hollow-fibre membrane of the invention, or produced by the method of the invention, has, in a preferred embodiment, a sieving coefficient for cytochrome c that satisfies equation (2):

$$SC_{CC} \geq 5 \cdot 10^{-5} \cdot UFR_{Alb}^3 - 0.004 \cdot UFR_{Alb}^2 + 0.1081 \cdot UFR_{Alb} - 0.12 \quad (2)$$

and, in an especially preferred embodiment, a sieving coefficient for cytochrome c that satisfies equation (3):

$$SC_{CC} \geq 5 \cdot 10^{-5} \cdot UFR_{Alb}^3 - 0.004 \cdot UFR_{Alb}^2 + 0.1081 \cdot UFR_{Alb} - 0.08 \quad (3)$$

The equations (1), (2) and (3) for the sieving coefficient for cytochrome c as a function of the ultrafiltration rate in albumin solution, $UFR_{Alb}$, are shown in FIG. 1 as the curves A, B and C.

In a further preferred embodiment of the invention, the maximum sieving coefficient for albumin is 0.003. In a particularly advantageous embodiment, the hollow-fibre membrane of the invention has a maximum sieving coefficient for albumin of 0.003 combined with a sieving coefficient for cytochrome c that satisfies equation (2):

$$SC_{CC} \geq 5 \cdot 10^{-5} \cdot UFR_{Alb}^3 - 0.004 \cdot UFR_{Alb}^2 + 0.1081 \cdot UFR_{Alb} - 0.12 \quad (2)$$

The hollow-fibre membranes that are particularly suitable in the context of the invention are those having a maximum sieving coefficient for albumin of 0.003 combined with a sieving coefficient for cytochrome c that satisfies equation (3):

$$SC_{CC} \geq 5 \cdot 10^{-5} \cdot UFR_{Alb}^3 - 0.004 \cdot UFR_{Alb}^2 + 0.1081 \cdot UFR_{Alb} - 0.08 \quad (3)$$

In general, the sieving coefficient for cytochrome c must always be lower than or equal to 1. In a further preferred embodiment of the invention, the sieving coefficient for cytochrome c, $SC_{CC}$, must satisfy one of equations (1), (2) and (3) as well as equation (4):

$$SC_{CC} \leq 5 \cdot 10^{-5} \cdot UFR_{Alb}^3 - 0.004 \cdot UFR_{Alb}^2 + 0.1081 \cdot UFR_{Alb} + 0.14 \quad (4)$$

whereby the condition $SC_{CC} \leq 1$ must simultaneously be satisfied.

As has been stated above, the sieving coefficients for low-molecular proteins decrease with the ultrafiltration rates of the membranes. Equations (1), (2) and (3) reflect this general trend of decreasing sieving coefficients for cytochrome c, $SC_{CC}$, with decrease in the ultrafiltration rate in albumin solution, $UFR_{Alb}$. It has been shown for the hollow-fibre membranes of the invention, or produced by the method of the invention, that for such membranes with an ultrafiltration rate in albumin solution, $UFR_{Alb}$, in the range of 5 to less than 12 ml/(h·m²·mmHg), i.e. for low-flux hollow-fibre membranes suitable for conventional hemodialysis, the sieving coefficients for cytochrome c are always equal to or greater than 0.4. On the other hand, hollow-fibre membranes of the invention with an ultrafiltration rate in albumin solution in the range of 12 to 25 ml/(h·m²·mmHg), i.e. hollow-fibre membranes suitable for conventional hemodiafiltration with low exchange volumes, show sieving coefficients for cytochrome c that are always equal to or greater than 0.6.

The invention therefore relates also to a hydrophilic, water-wettable, semipermeable hollow-fibre membrane, comprising a synthetic first polymer, for blood purification, with an ultrafiltration rate in albumin solution in the range of 5 to less than 12 ml/(h·m²·mmHg), the hollow-fibre membrane possessing an open-pored, integrally asymmetric structure across its wall, a porous separating layer of thickness 0.1 to 2 μm on its inner surface facing the lumen, and an open-pored supporting layer adjoining the separating layer, characterised in that without pore-stabilising additives in the membrane wall, and after prior drying, the hollow-fibre membrane has a maximum sieving coefficient for albumin of 0.005 combined with a minimum sieving coefficient for cytochrome c of 0.4. This hollow-fibre membrane preferably has a minimum sieving coefficient for cytochrome c of 0.47.

The invention further relates to a hydrophilic, water-wettable, semipermeable hollow-fibre membrane, comprising a synthetic first polymer, for blood purification, with an ultrafiltration rate in albumin solution in the range of 12 to 25 ml/(h·m²·mmHg), the hollow-fibre membrane possessing an open-pored, integrally asymmetric structure across its wall, a porous separating layer of thickness 0.1 to 2 μm on its inner surface facing the lumen, and an open-pored supporting layer adjoining the separating layer, characterised in that without pore-stabilising additives in the membrane wall, and after prior drying, the hollow-fibre membrane has a maximum sieving coefficient for albumin of 0.005 combined with a minimum sieving coefficient for cytochrome c of 0.6. The hollow-fibre membrane preferably has a minimum sieving coefficient for cytochrome c of 0.7, and especially preferably of 0.8.

The membranes of the invention have excellent separation properties with sharp separation characteristics. They allow excellent elimination of low-molecular proteins and at the same time excellent retention of albumin, without the need for pore stabilisation by post-treatment of the membranes with a liquid pore stabiliser such as glycerol or polyethylene glycol. On account of the sharp separation characteristics and the excellent retention of albumin, the structure or separating layer of the membranes of the invention can even be implemented so as to be more open without the sieving coefficients for albumin exceeding the limits required by the invention. This allows a further increase in the sieving coefficients for cytochrome c, and the elimination of low-molecular proteins such as $\beta_2$-microglobulin can be further improved.

The membranes of the invention generally also show improved pyrogen retention. For application in dialysis, the extent to which the membrane used for the blood treatment can inhibit transfer of endotoxins and pyrogens through the membrane wall is of relevance. According to previous studies, in many dialysis centres pyrogens have been detected in particular in the dialysis liquid. This gives rise to the risk, not only in high-flux membranes but also in those with lower ultrafiltration rates, of pyrogens or biologically active endotoxin fragments passing through the membrane wall. The membranes of the invention are essentially impermeable to pyrogens, thereby providing a higher degree of safety for dialysis patients.

In the context of the present invention, an integrally asymmetric membrane is understood to be a membrane in which the separating layer and supporting layer consist of the same material and were formed together simultaneously on production of the membrane, as a result of which the layers are bound to each other as an integral unit. Only the membrane structure changes from the separating layer to the supporting layer. Starting from the separating layer, the pore size in the support structure changes across the wall thickness in the integrally asymmetric membrane. This is to be contrasted with, on the one hand, composite membranes having a multilayer structure obtained by applying a dense layer as a separating layer on top of a porous, often microporous, supporting layer or supporting membrane in a separate process step. As a result, the materials that constitute the supporting layer and the separating layer also have different properties in composite membranes. In symmetric membranes or homogeneous membranes, on the other hand, the size of the membrane pores is essentially uniform, i.e., does not change significantly, across the membrane wall. On account of the low thickness of the separating layer, integrally asymmetric membranes normally offer the advantage over symmetric, homogeneous membranes, i.e. membranes for which pore size is uniform across the wall thickness, of a significant reduction in hydraulic resistance and therefore improved convective transport, in particular of substances in the middle-molecular range. In addition, they also allow independent control of the hydraulic permeability and separation characteristics of the membrane.

In general, the treatment or loading of state-of-the-art membranes with, e.g., glycerol promotes stabilisation of the pore structure, and is often carried out for state-of-the-art membranes to ensure a certain separation efficiency even after the drying step that is necessary during the processing of the membrane. In the processing of hollow-fibre membranes to produce a dialyser, however, glycerol-containing membranes give rise to disadvantages, for example in the usual embedding of the ends of the hollow-fibre membranes in an embedding resin. The glycerol-containing membranes often adhere to one another, so that the embedding material, e.g. polyurethane, cannot penetrate into the intermediate spaces between the hollow-fibre membranes. This results in imperfect sealing in the embedding process. Moreover, dialysers containing glycerol-loaded membranes require extensive flushing before use, i.e. before use for blood purification, in order to free the membranes from glycerol. In addition, these state-of-the-art membranes may not be dried after the glycerol has been removed, because drying causes significant deterioration of the separation characteristics, and in particular a marked reduction of separation efficiency in the middle-molecular range, i.e. for low-molecular proteins, as well as, in some cases, deterioration of wetting behaviour.

In contrast, the hollow-fibre membranes of the invention remain wettable with water or aqueous media even after drying, on account of their hydrophilic properties. Moreover, they retain their characteristic separation properties after drying, i.e. in the dry state, even if they were not post-treated, e.g. with a glycerol solution, after extraction and before drying. They retain their characteristic separation properties even if the hollow-fibre membranes in the dry state are free from additives that stabilise the pores in the membrane wall, i.e. also if in the dry state of the hollow-fibre membranes of the invention the pores in the membrane wall contain no additives that stabilise them. In contrast to state-of-the-art membranes, therefore, the membranes of the invention have stable and excellent separation characteristics, and therefore improved separation behaviour.

The membrane of the invention can of course be loaded with glycerol after drying, if this is considered appropriate. In contrast to known hollow-fibre membranes, the hollow-fibre membrane of the invention retains its properties, including its sharp separation characteristics, even after removal of the glycerol and subsequent drying. As stated above, the hollow-fibre membrane of the invention retains its properties after extraction and drying, even in the absence of treatment with pore-stabilising additives before drying. In regard to the sharp separation characteristics, it is, in addition, immaterial whether the membrane has been subjected to subsequent sterilisation, as is usual during the production of dialysers. The present invention therefore encompasses also sterilised membranes.

The hollow-fibre membranes of the invention have an ultrafiltration rate in albumin solution in the range of 5 to 25 ml/(h·m²·mmHg). Ultrafiltration rates in albumin solution lower than 5 ml/(h·m²·mmHg) are not adequate for the removal of sufficiently large quantities of water in blood treatment in conjunction with convective transport of the substances to be removed from the blood. For ultrafiltration rates in albumin solution exceeding 25 ml/(h·m²·mmHg), on the other hand, the risk exists, as stated above, of strong flow-rate fluctuations occurring during application, and, in addition, of possible backfiltration due to negative transmembrane pressure in parts of the dialysers.

The first polymer constituting the membrane structure of the hydrophilic hollow-fibre membranes is, according to the invention, a synthetic polymer that, in the method of the invention, is contained in the spinning solution in a concentration of 12 to 30 wt. %. This synthetic first polymer can be a hydrophilic synthetic polymer or a mixture of various hydrophilic synthetic polymers. Thus, for example, hydrophilic polyamides, polyvinyl alcohols, ethylene vinyl alcohol copolymers, polyether polyamide block copolymers, polyethylene oxide polycarbonate copolymers, or modified, originally hydrophobic polymers such as polysulfones or polyethersulfones hydrophilically modified with sulfonic acid groups can be used.

In the production of the membranes of the invention using a hydrophilic first polymer, the spinning solution can contain, as an additional component, a hydrophilic second polymer, which has the effect of increasing the viscosity in the spinning solution and/or functions also as a nucleating agent and pore-forming agent in the formation of the membrane structure.

In a preferred embodiment, the synthetic first polymer constituting the hollow-fibre membranes of the invention is a hydrophobic first polymer, which is combined with a hydrophilic second polymer. If a hydrophobic first polymer is used, the hydrophilic second polymer, in addition to increasing the viscosity of the spinning solution and/or functioning as a nucleating agent and pore-former in the method of the invention, also has the function of ensuring the hydrophilicity of the hollow-fibre membranes of the invention. These preferred hollow-fibre membranes therefore comprise a hydrophobic first polymer and a hydrophilic second polymer.

If a hydrophilic second polymer is used, its concentration in the spinning solution is 0.1 to 30 wt. % relative to the weight of the spinning solution. The concentration of the hydrophilic second polymer in the spinning solution is preferably 1 to 25 wt. % and especially preferably 5 to 17 wt. % relative to the weight of the spinning solution.

For the method of the invention, the polymers that can be used as the synthetic first polymer are those that have good solubility in polar aprotic solvents and can be precipitated out from these with the formation of asymmetric membranes. In the context of the present invention, engineering plastics from the group of aromatic sulfone polymers such as polysulfone, polyethersulfone, polyphenylenesulfone or polyarylethersulfone, polycarbonates, polyimides, polyetherimides, polyetherketones, polyphenylene sulfides, copolymers or modifications of these polymers, or mixtures of these polymers are used as preferred hydrophobic first polymers that are membrane-forming, i.e. that constitute the structure of the hollow-fibre membranes of the invention. In a particularly preferred embodiment, the hydrophobic first polymer is a polysulfone or a polyethersulfone with the repeating molecular units shown in the formulas I and II:

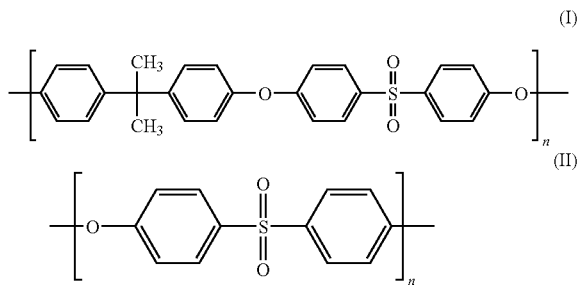

The hollow-fibre membranes of the invention can essentially be produced by methods known in the state of the art for production from a synthetic polymer of hydrophilic, water-wettable, semipermeable hollow-fibre membranes that have an integrally asymmetric structure and a separating layer on the inner surface. Such state-of-the-art methods are described in, for example, EP 168 783, EP 716 859, EP 750 938, EP 828 553 and EP 997 182, reference to the relevant disclosures of which is hereby explicitly made. On the basis of the methods described therein, for example, an interior filler is used, according to the method of the invention, that contains a polyelectrolyte with negative fixed charges to form a hollow-fibre membrane with a maximum sieving coefficient for albumin of 0.005 combined with a sieving coefficient for cytochrome c that satisfies the equations of the invention expressing $SC_{CC}$ as a function of $UFR_{Alb}$.

According to the invention, the concentration of the synthetic first polymer in the spinning solution is 12 to 30 wt. %. Concentrations below 12 wt. % give rise to disadvantages in the execution of the spinning process and in regard to the mechanical stability of the hollow-fibre membrane produced. On the other hand, membranes obtained from spinning solutions containing more than 30 wt. % of the synthetic first polymer have a structure that is too dense and permeabilities that are too low. The spinning solution preferably contains 15 to 25 wt. % of the synthetic first polymer. The synthetic first polymer can also contain additives such as antioxidants, nucleating agents, UV absorbers, etc. to modify the properties of the membranes in a targeted manner.

The hydrophilic second polymers used are advantageously long-chain polymers that are compatible with the synthetic first polymer and have repeating polymer units that are in themselves hydrophilic. The hydrophilic second polymer is preferably polyvinylpyrrolidone, polyethylene glycol, polyvinyl alcohol, polyglycol monoester, a polysorbate, such as polyoxyethylene sorbitan monooleate, carboxylmethylcellulose, or a modification or copolymer of these polymers. Polyvinylpyrrolidone is especially preferred. In a further preferred embodiment, it is also possible to use mixtures of various hydrophilic polymers and particularly mixtures of hydrophilic polymers of different molecular weights, e.g. mixtures of polymers whose molecular weights differ by a factor of 5 or more.

A considerable proportion of the hydrophilic second polymer is washed out of the membrane structure during production of the hollow-fibre membranes of the invention. In view of the hydrophilic properties of the hollow-fibre membranes of the invention and their wettability, however, it is necessary, in the case of the preferred use of a hydrophobic first polymer as synthetic first polymer, that a certain proportion of the hydrophilic second polymer remains in the membrane. In the case of the preferred use of a hydrophobic first polymer as synthetic first polymer, therefore, the finished hollow-fibre membranes preferably contain the hydrophilic second polymer in a concentration in the range of 1 to 15 wt. %, and especially preferably in the range of 3 to 10 wt. %, relative to the weight of the finished hollow-fibre membrane. In addition, the hydrophilic second polymer can be chemically or physically modified even in the finished membrane. Polyvinylpyr-rolidone, for example, can subsequently be made water-insoluble through crosslinking.

The solvent system to be used must be coordinated with the synthetic first polymer used and, if necessary, with the hydrophilic second polymer. According to the invention, the solvent system used to prepare the spinning solution comprises polar aprotic solvents such as, in particular, dimethylformamide, dimethylacetamide, dimethyl sulfoxide, N-methylpyrrolidone or ε-caprolactam, or mixtures of these solvents with one another. The solvent system can contain additional cosolvents; where ε-caprolactam is used, butyrolactone, propylene carbonate or polyalkylene glycol have proved useful for this purpose. In addition, the solvent system can also contain non-solvents for the polymer such as water, glycerol, polyethylene glycols, or alcohols such as ethanol or isopropanol.

After degassing and filtration to remove undissolved particles, the homogeneous spinning solution is extruded into a hollow fibre through the annular slit of a conventional hollow-fibre die. Through the central die opening, which is positioned coaxially with the annular slit in the hollow-fibre die, an interior filler is extruded that is a coagulation medium for the hydrophobic first polymer and that simultaneously stabilises the lumen of the hollow fibre.

The interior filler, i.e. the inner coagulation medium, consists of one of the above-mentioned solvents, preferably a solvent that is also used in the solvent system of the spinning solution, or the solvent system used to prepare the spinning solution, as well as, necessarily, a non-solvent. This non-solvent should initiate the coagulation of the synthetic first polymer, but should preferably dissolve the hydrophilic second polymer that may be present. If a non-solvent is contained in the solvent system, the non-solvent contained in the interior filler can be the same, whereby to attain adequate precipitating effect the non-solvent concentration in the interior filler is naturally higher than that in the solvent system. However, the non-solvent used for the interior filler can be different from that used for the solvent system. The non-solvent used can also comprise a number of different non-solvent components.

According to the invention, the interior filler contains a polyelectrolyte with negative fixed charges, the polyelectrolyte in the interior filler being in dissolved form. In the context of the present invention, a polyelectrolyte with negative fixed charges is understood to be a polymer that contains functional groups with negative charges, or that can form such groups in an adequately basic medium, the functional groups being covalently bound to the polymer. As a result, the negative charges are also necessarily covalently, and therefore firmly bound to the polymer.

It is important that the polyelectrolyte with fixed negative charges used in the invention be in fact a polymer with the properties defined above, i.e. a molecule in which a large number, preferably at least a few hundred and especially preferably at least a few thousand, monomer units are covalently bound, resulting in a molecular weight that lies preferably in the range>7,000 daltons and especially preferably in the range>70,000 daltons. The use in the interior filler of low-molecular electrolytes with negative fixed charges, such as citric acid, whose three acid groups can form three negative ions, results in membranes that do not have increased separation efficiency. It is also important that the polyelectrolyte used in the invention possess negative fixed charges. If polyelectrolytes with positive fixed charges, such as a copolymer of vinylpyrrolidone and methacrylamidopropyl trimethyl ammonium chloride, are added to the interior filler, the resulting membranes again show no increased separation efficiency.

In a preferred embodiment of the invention, the polyelectrolyte with negative fixed charges is selected from the group of polyphosphoric acids, polysulfonic acids, and polycarboxylic acids, and particularly, in the last case, homo- and copolymers of acrylic acid. Partially cross-linked acrylic acids, copolymers of methacrylic acid and methyl methacrylate, copolymers of acrylic acid and vinylpyrrolidone, and copolymers of acrylic acid, vinylpyrrolidone and lauryl methacrylate have proved to be particularly effective in regard to improvement of the separation behaviour of the hollow-fibre membranes.

A particularly marked increase of separation efficiency is observed when the polyelectrolyte with negative fixed charges is so chosen as to be completely soluble in the interior filler that acts as a precipitant, but not in the individual components of the interior filler. Moreover, a particularly marked increase of separation efficiency is observed when the polyelectrolyte with negative fixed charges used for the invention is so chosen that it precipitates in contact with the spinning solution.

The concentration of the polyelectrolyte with negative fixed charges in the interior filler is preferably 0.01 to 5 wt. % relative to the weight of interior filler. For concentrations below 0.01 wt. %, the sharp separation characteristics of the invention are no longer obtained. If, on the other hand, the concentration of the polyelectrolyte used for the invention lies above 5 wt. %, the solubility of the additive in the interior filler, and therefore adequate spinning stability, can no longer be ensured. Moreover, concentrations above 5 wt. % often lead to reduction in the permeabilities of the membranes. The particularly preferred concentration of the polyelectrolyte with negative fixed charges is 0.05 to 1 wt. %.

The precipitating effect of the interior filler must be so adjusted that a separating layer is formed on the inner surface, i.e. the lumen-facing side, of the hollow-fibre membrane, and an adjoining supporting layer facing toward the outside of the hollow-fibre membrane. In combination with the addition of a polyelectrolyte with negative fixed charges to the interior filler, the method of the invention allows production for the first time of hollow-fibre membranes that show the sharp separation characteristics required by the invention with, in particular, high sieving coefficients for cytochrome c, even after drying and without prior treatment with an additive, such as glycerol, that stabilises the pores in the membrane wall. It is assumed that the polyelectrolyte with negative fixed charges influences the formation of the separating layer, and particularly the formation of the pores in the separating layer, in the direction of a narrower pore-size distribution, and also influences the surface polarity of the membrane. The latter has the effect of a change in the secondary membrane when the membranes of the invention are used. It is further assumed that the changes in respect of the separating layer are also the cause of the greater security of the membranes of the invention against the passage of pyrogens.

The polyelectrolyte with negative fixed charges is physically bound in the separating layer. This means that the said polyelectrolyte is not chemically bound in the separating layer of the membrane of the invention. The physical binding of the polyelectrolyte in the separating layer is so stable that neither washing and extraction, which are unavoidable during wet-chemical production of the membrane, nor sterilisation and the use of the membrane of the invention lead to significant loss of polyelectrolyte from the membrane, or to a membrane free from polyelectrolyte. A tentative explanation is that the polyelectrolyte is securely anchored in the separating layer of the membrane of the invention by interlocking and entanglement between the polymer chains of the polyelectrolyte and those of the membrane-forming polymer, as occur, for example, during the method of the invention by bringing the inner surface of the solvent-containing hollow fibre formed in step b) into contact with the polyelectrolyte-containing interior filling.

Suitable detection methods such as ESCA/XPS, IR-spectroscopic evidence as obtained from Fourier transform infrared spectroscopy (FTIR-ATR), and reaction of the acid polyelectrolyte with basic dyes establish that in the hollow-fibre membranes produced by the method of the invention, polyelectrolyte with negative fixed charges is contained in the separating layer. The major part of the supporting layer, on the other hand, is essentially free from polyelectrolyte with negative fixed charges.

Depending on the structure desired for the supporting layer adjoining the separating layer and in the region of the outer surface of the hollow-fibre membrane, the hollow fibre, in a preferred embodiment of the method of the invention, following its exit from the hollow-fibre die, first traverses an air gap before being immersed in an outer coagulation bath and passed through this. The airgap is especially preferably conditioned and temperature-controlled with water vapour, to set defined conditions before the start of coagulation on the outside of the hollow fibre, e.g. by dosed uptake of non-solvent from the conditioned atmosphere, as a result of which deferred precoagulation occurs. The diffusion-induced coagulation can then be completed in the outer coagulation bath, which is preferably temperature controlled and preferably an aqueous bath, and the membrane structure can be fixed. However, if, on account of the precipitating effect of the interior liquid, the hollow fibre is fully precipitated from the interior to the exterior even before immersion in the outer coagulation bath, the sole functions of the outer coagulation bath may be to fix the membrane structure and to ensure extraction of the hollow-fibre membrane. Instead of using a conditioned air gap that retards coagulation on the outside of the hollow fibre, extrusion can also be carried out directly into an outer coagulation bath that exerts a weaker precipitating effect than the interior filler.

Following the coagulation and the fixing of the membrane structure, the hollow-fibre membrane so obtained is extracted to free it from residues of the solvent system and other soluble organic substances. If a hydrophilic second polymer is used, a significant proportion of the hydrophilic second polymer is normally also removed during extraction. If a hydrophobic first polymer is used, however, part of the hydrophilic second polymer remains in the membrane of the invention to ensure sufficient hydrophilicity and weftability. The concentration of the hydrophilic second polymer is then preferably 1 to 15 wt. %, and especially preferably 3 to 10 wt. %, relative to the weight of the membrane of the invention.

After the extraction the hollow-fibre membranes are dried, textured, if necessary, to improve the exchange properties of the hollow-fibre membranes in the subsequent bundle, and finally, for example, wound up on a bobbin or processed into bundles with a suitable fibre count and length, by the usual methods. The hollow-fibre membranes can also be provided with supplementary threads, e.g. in the form of multifilament yarns, before production of the bundles, to ensure spacing of the hollow-fibre membranes from one another and allow better flow around individual hollow-fibre membranes.

It is also possible to crosslink the residual hydrophilic second polymer in the hollow-fibre membrane of the invention by, for example, irradiation and/or application of heat, to make the hydrophilic polymer insoluble and prevent its being washed out in later application. The usual known state-of-the-art methods can be used for this purpose.

In a preferred embodiment of the hollow-fibre membranes of the invention, the supporting layer extends from the separating layer across essentially the entire wall of the hollow-fibre membrane, and has a sponge-like structure that is free from finger pores. Membranes of this type possess higher mechanical strength than membranes with large, cavernous pores, i.e. having a structure with finger pores. This allows lower wall thicknesses and consequently a larger range in relation to the hydraulic permeability of the membranes of the invention.

The internal diameter of the membranes of the invention is preferably 100 to 500 µm and especially preferably 150 to 300 µm. The wall thickness is preferably between 10 and 60 µm and especially preferably between 25 and 45 µm.

In another preferred embodiment of the invention, the sponge-like supporting layer adjoins, on the side facing away from the separating layer, a layer whose pores are of a lower size than those in the supporting layer, and in which the pore size decreases in the direction towards the outside, or the structure of the sponge-like supporting layer becomes more dense in the outer region of the membrane wall towards the outer surface. Membranes with such pore structures are described in EP 828 553, reference to the disclosures of which is hereby explicitly made, as stated above.

The invention will now be described in more detail with the help of the examples below.

The following methods have been used in the examples for characterisation of the membranes obtained:

Ultrafiltration Rate in Albumin Solution, Sieving Coefficients for Cytochrome c and Albumin The ultrafiltration rate in albumin solution (BSA solution), denoted below by $UFR_{Alb}$, and the sieving coefficients for cytochrome c, $SC_{CC}$, and albumin, $SC_{Alb}$, are determined following DIN 58 353 Part 2.

A phosphate buffered saline solution (PBS) containing 50 g/l of bovine serum albumin (BSA) and 100 mg/l of cytochrome c is used as the test solution. The formulation of the PBS solution is from the German Pharmacopoeia (DAB 10.1, Supplement VII.I.3, 1992, Phosphate Buffer Solution, pH 7.4, Containing Sodium Chloride R ["Phosphatpufferlösung pH 7,4, natriumchloridhaltige R"]). The measurement is performed on hollow-fibre membrane modules with an effective membrane surface area of approx. 250 cm$^2$ and an effective hollow-fibre membrane length of 180 mm. Measurements are performed at 37° C. A flow rate $Q_B$ of 200 ml/(min·m$^2$) through the hollow-fibre membranes is established by means of a first pump on the inlet side of the membrane module, and a filtrate flow rate of $Q_F$=10 ml/(min·m$^2$) through the membrane wall is set by regulation of a second pump on the outlet side of the membrane module in relation to the first pump on the inlet side. The transmembrane pressure (TMP) that is established as a result of the filtrate flow $Q_F$ is recorded during the measurement.

$UFR_{Alb}$ is calculated from the formula:

$$UFR_{Alb} = \frac{Q_F \cdot 60}{TMP \cdot 0.75} [ml/(h \cdot m^2 \cdot mmHg)],$$

where
$Q_F$=filtrate flow rate in [ml/(min·m$^2$)] relative to an effective membrane area of 1 m$^2$
TMP=transmembrane pressure in [hPa]

The sieving coefficients SC are determined using the formula:

$$SC = \frac{2 \cdot c_F}{c_{ST} + c_R},$$

where
$c_F$=concentration of albumin or cytochrome c in the filtrate
$c_{ST}$=original (stock) concentration of the albumin or cytochrome c
$c_R$=concentration of albumin or cytochrome c in the retentate The BSA concentration is determined by a method of Boehringer Mannheim that uses an automatic analyser for clinical chemistry, such as a Hitachi 704 Automatic Analyzer. The determination is based on a bromocresol green method. Cytochrome c is also determined by means of the Hitachi 704. To eliminate interference from BSA in measuring the extinction for cytochrome c at the wavelength λ=415 nm, a dilution series of BSA in PBS from 0 to approx. 80 g/l of BSA must first be measured, and the slope of the straight line obtained by plotting the extinction at λ=415 nm against the BSA concentration determined. The correction factor is obtained from the slope and the current concentration CST Of BSA in the sample.

COMPARATIVE EXAMPLE 1

A spinning solution is prepared from 19.0 wt. % of polyethersulfone (Ultrason E 6020 from BASF), 13.68 wt. % of polyvinylpyrrolidone (PVP K30 from ISP), 31.98 wt. % of ε-caprolactam, 31.98 wt. % of γ-butyrolactone and 3.36 wt. % of glycerol by intensive mixing at a temperature of approx. 100° C. The resulting homogeneous solution is then cooled to approx. 60° C., degassed, filtered, and conveyed to the annular slit of a hollow-fibre die that is maintained at a temperature of 62° C. For the formation of the lumen and the inner separating layer, an interior filler consisting of ε-caprolactam and water in the ratio 55:45 by weight is extruded through the needle of the hollow-fibre die. The hollow fibre formed is conducted through a conditioning channel (approx. 55° C., relative humidity 80%), precipitated and fixed in a coagulation bath containing water maintained at approx. 55° C., washed with water at approx. 90° C., and dried at approx. 90° C. This results in a hollow-fibre membrane with a lumen diameter of approx. 0.2 mm and a wall thickness of approx. 0.035 mm.

EXAMPLE 1

A hollow-fibre membrane is produced as in comparative example 1, except that 0.5 wt. % of the polyelectrolyte Acrylidone ACP 1005 (from ISP), relative to the weight of interior filler, is also dissolved in the interior filler. To produce the interior filler, the mixture of ε-caprolactam and water is first prepared, and the Acrylidone ACP 1005 is dissolved in this mixture.

Table 1 shows the $UFR_{Alb}$, $SC_{CC}$ and $SC_{Alb}$ of the hollow-fibre membranes of comparative example 1 and example 1.

TABLE 1

| Membrane from | Polyelectrolyte in the interior filler | $UFR_{Alb}$ ml/(h·m²·mmHg) | $SC_{Alb}$ | $SC_{CC}$ |
|---|---|---|---|---|
| Comparative example 1 | — | 13.1 | 0.002 | 0.305 |
| Example 1 | 0.5 wt. % of ACP 1005 | 14.4 | 0.001 | 0.846 |

As Table 1 shows, the addition of the polyelectrolyte to the interior filler results in a hollow-fibre membrane with considerably increased selectivity for separation of albumin and cytochrome c.

COMPARATIVE EXAMPLE 2

To produce a polyethersulfone membrane, a homogeneous spinning solution is prepared from 19.0 wt. % of polyethersulfone (Ultrason E 6020 from BASF), 4.75 wt. % of polyvinylpyrrolidone (PVP K90 from ISP), 68.62 wt. % of dimethylacetamide (DMAC) and 7.63 wt. % of glycerol by intensive mixing at a temperature of approx. 70° C. The resulting solution is cooled to approx. 50° C., degassed, filtered, and conveyed to the annular slit of a hollow-fibre die that is maintained at a temperature of 45° C. An interior filler consisting of 30 parts by weight of DMAC, 65 parts by weight of water and 5 parts by weight of glycerol is extruded through the needle of the hollow-fibre die. The hollow fibre formed is conducted through a conditioning channel (50° C., relative humidity 90%), precipitated and fixed in water maintained at approx. 70° C., washed with water at approx. 90° C., and finally dried at approx. 90° C. This results in a hollow-fibre membrane with a lumen diameter of 0.2 mm and a wall thickness of 0.035 mm. Table 2 shows the properties of the hollow-fibre membrane so obtained.

EXAMPLE 2

A hollow-fibre membrane is produced as in comparative example 2, except that 0.5 wt. % of the polyelectrolyte Acrylidone ACP 1005 (from ISP), relative to the weight of interior filler, is also dissolved in the interior filler. To prepare the interior filler, the Acrylidone ACP 1005 is first dispersed in the dimethylacetamide, water is then added, and a homogeneous solution is prepared at approx. 70° C. The solution is finally cooled to 30° C.

Table 2 shows the $UFR_{Alb}$, $SC_{CC}$ and $SC_{Alb}$ of the hollow-fibre membranes of comparative example 2 and example 2.

TABLE 2

| Membrane from | Polyelectrolyte in the interior filler | $UFR_{Alb}$ ml/(h·m²·mmHg) | $SC_{Alb}$ | $SC_{CC}$ |
|---|---|---|---|---|
| Comparative example 2 | — | 11.7 | 0.002 | 0.211 |
| Example 2 | 0.5 wt. % of ACP 1005 | 12.6 | 0.001 | 0.830 |

EXAMPLES 3a-h

A homogeneous spinning solution is prepared by intensive mixing in a stirring vessel of 19.0 wt. % of polyethersulfone (Ultrason E 6020 from BASF), 13.3 wt. % of polyvinylpyrrolidone (PVP K30 from ISP), 62.96 wt. % of N-methylpyrrolidone (NMP) and 4.74 wt. % of water at a temperature of approx. 70° C. The solution is cooled to approx. 50° C., degassed, filtered and conveyed to the annular slit of a hollow-fibre die that is maintained at a temperature of 45° C. For the formation of the lumen and the inner separating layer, an interior filler consisting of NMP and water is extruded through the needle of the hollow-fibre die.

Eight different membranes are prepared with different ultrafiltration rates in albumin solution. The composition of the interior filler is varied stepwise with the NMP:water ratio ranging between 45:55 and 52:48 by weight. In addition to NMP and water, 0.1 wt. % of the polyelectrolyte Rohagit S hv (from Degussa/Röhm), relative to the weight of interior filler, is dissolved in the interior filler in each case. To prepare the interior filler in each case, the Rohagit S hv is first dispersed in the NMP and dissolved after addition of water at approx. 70° C., and the solution is then cooled to 30° C.

The hollow fibre formed in each case is conducted through a conditioning channel (50° C., relative humidity 90%) and precipitated in a water bath maintained at approx. 70° C. After washing with water at 80° C. and drying in hot air, hollow-fibre membranes result with a lumen diameter of 0.2 mm and a wall thickness of 0.035 mm. Table 3 shows the $UFR_{Alb}$, $SC_{CC}$ and $SC_{Alb}$ of the hollow-fibre membranes of examples 3a-h.

TABLE 3

| Membrane from | $UFR_{Alb}$ ml/(h·m²·mmHg) | $SC_{ALB}$ | $SC_{CC}$ |
|---|---|---|---|
| Example 3a | 5.0 | 0.001 | 0.470 |
| Example 3b | 7.8 | 0.001 | 0.734 |
| Example 3c | 10.7 | 0.001 | 0.760 |
| Example 3d | 12.1 | 0.001 | 0.850 |

TABLE 3-continued

| Membrane from | UFR$_{Alb}$ ml/(h · m$^2$ · mmHg) | SC$_{ALB}$ | SC$_{CC}$ |
|---|---|---|---|
| Example 3e | 15.8 | 0.000 | 0.920 |
| Example 3f | 16.1 | 0.001 | 0.980 |
| Example 3g | 17.7 | 0.001 | 0.870 |
| Example 3h | 23.5 | 0.001 | 0.920 |

The SC$_{CC}$ values for examples 3a-h are plotted against the UFR$_{Alb}$ values in FIG. 1. It is seen that the experimentally obtained values for SC$_{CC}$ lie in every case above the limiting curves calculated for SC$_{CC}$ as a function of UFR$_{Alb}$ in accordance with the claims of the invention.

For comparative purposes, hollow-fibre membranes with interior fillers containing no Rohagit S hv are prepared analogously to examples 3a-h. For the range of ultrafiltration rates typically encountered in conventional low-flux hemodialysis, i.e. for UFR$_{Alb}$ from approx. 4 to below approx. 15 ml/(h·m$^2$·mmHg), and with SC$_{Alb}$ being 0.001 in each case, the values obtained for SC$_{CC}$ lie in the range of 0.050 to 0.250. For membranes that would find use in, e.g., conventional hemodiafiltration with low exchange volumes, i.e. with a UFR$_{Alb}$ in the range of approx. 15 to approx. 23.5 ml/(h·m$^2$·mmHg), and for an SC$_{Alb}$ of 0.001, the values determined for SC$_{CC}$ lie in the range of 0.25 to 0.5.

COMPARATIVE EXAMPLE 4

A homogeneous spinning solution is prepared by intensive stirring of 19.0 wt. % of polyethersulfone (Ultrason E 6020 from BASF), 13.3 wt. % of polyvinylpyrrolidone (PVP K30 from ISP), 62.96 wt. % of N-methylpyrrolidone (NMP) and 4.74 wt. % of water at a temperature of approx. 60° C. The resulting solution is degassed, filtered, and conveyed to the annular slit of a hollow-fibre die that is maintained at a temperature of 45° C. For the formation of the lumen and the separating layer, an interior filler consisting of 44 parts by weight of NMP and 56 parts by weight of water is extruded through the needle of the hollow-fibre die. The hollow fibre formed is conducted, after its exit from the die, through a conditioning channel (55° C., relative humidity 70%) and precipitated in a water bath maintained at 58° C. After washing with water at 90° C. and drying in hot air, a hollow-fibre membrane results with a lumen diameter of 0.2 mm and a wall thickness of 0.03 mm.

EXAMPLE 4

A hollow-fibre membrane is produced as in comparative example 4, except that the interior filler consists of 43.87 parts by weight of NMP and 55.88 parts by weight of water, with the addition of 0.25 parts by weight of Styleze 2000.

Table 4 shows the UFR$_{Alb}$, SC$_{Alb}$ and SC$_{CC}$ of the membranes of comparative example 4 and example 4.

TABLE 4

| Membrane from | Polyelectrolyte in the interior filler | UFR$_{Alb}$ ml/(h · m$^2$ · mmHg) | SC$_{ALB}$ | SC$_{CC}$ |
|---|---|---|---|---|
| Comparative example 4 | — | 12.28 | 0.003 | 0.129 |
| Example 4 | 0.25 wt. % of Styleze 2000 | 11.04 | 0.002 | 0.784 |

COMPARATIVE EXAMPLE 5

A homogeneous spinning solution is prepared from 19.0 wt. % of polysulfone (Ultrason S 6010 from BASF), 13.3 wt. % of polyvinylpyrrolidone (PVP K30 from ISP), 65.87 wt. % of N-methylpyrrolidone (NMP) and 1.83 wt. % of water. For this purpose the polysulfone is first stirred into the greater part of the NMP at a temperature of 70° C. and then dissolved at 90° C. to give a homogeneous solution. The PVP K30 is then added with stirring and likewise dissolved. The resulting solution is cooled to 50° C., and the water and the remaining NMP are then added. The homogeneous solution so obtained is degassed, filtered, and conveyed to the annular slit of a hollow-fibre die that is maintained at a temperature of 40° C. An interior filler consisting of 60 parts by weight of NMP and 40 parts by weight of water is extruded through the needle of the hollow-fibre die. The hollow fibre formed is conducted through a conditioning channel (50° C., relative humidity 90%), precipitated and fixed in a coagulation bath containing water maintained at 70° C., and then washed and dried. This results in a hollow-fibre membrane with a lumen diameter of 0.2 mm and a wall thickness of 0.035 mm.

EXAMPLE 5

A polysulfone hollow-fibre membrane is produced as in comparative example 5, except that 0.5 wt. % of the polyelectrolyte Acrylidone ACP 1005 (from ISP), relative to the weight of interior filler, is also dissolved in the interior filler. To produce the interior filler, the Acrylidone ACP 1005 is first dispersed in the NMP, water is then added, and a homogeneous solution is prepared at approx. 70° C. The solution is finally cooled to 30° C.

Table 5 shows the UFR$_{Alb}$, SC$_{CC}$ and SC$_{Alb}$ of the hollow-fibre membranes of comparative example 5 and example 5.

TABLE 5

| Membrane from | Polyelectrolyte in the interior filler | UFR$_{Alb}$ ml/(h · m$^2$ · mmHg) | SC$_{Alb}$ | SC$_{CC}$ |
|---|---|---|---|---|
| Comparative example 5 | — | 12.9 | 0.017 | 0.470 |
| Example 5 | 0.5 wt. % of ACP 1005 | 17.7 | 0.003 | 0.890 |

COMPARATIVE EXAMPLE 6

A homogeneous spinning solution is prepared from 19.0 wt. % of polyphenylenesulfone (Radel R 5000 NT from Solvay), 13.3 wt. % of polyvinylpyrrolidone (PVP K30 from ISP), 64.32 wt. % of N-methylpyrrolidone (NMP) and 3.38 wt. % of water. For this purpose the polyphenylenesulfone is first stirred into the greater part of the NMP at a temperature of 70° C. and then homogeneously dissolved at 90° C. The PVP K30 is then added with stirring and likewise dissolved. The resulting solution is cooled to 50° C., and the water and the remaining NMP are then added. The homogeneous solution so obtained is degassed, filtered, and conveyed to the annular slit of a hollow-fibre die that is maintained at a temperature of 45° C. An interior filler consisting of 63 parts by weight of NMP and 37 parts by weight of water is extruded through the needle of the hollow-fibre die. The hollow fibre formed is conducted through a conditioning channel (50° C., relative humidity 90%), and precipitated in a coagulation bath with water maintained at 70° C. After washing with water at 90° C. and drying, a hollow-fibre membrane results with a lumen diameter of 0.2 mm and a wall thickness of 0.035 mm. Table 6 shows the properties of the hollow-fibre membrane so obtained.

EXAMPLE 6

A polyphenylenesulfone hollow-fibre membrane is produced as in comparative example 6, except that 0.5 wt. % of the polyelectrolyte Acrylidone ACP 1005 (from ISP), relative to the weight of interior filler, is also dissolved in the interior filler. To prepare the interior filler, the Acrylidone ACP 1005 is first dispersed in the NMP, water is then added, and a homogeneous solution is prepared at approx. 70° C. The solution is finally cooled to 30° C.

Table 6 shows the $UFR_{Alb}$, $SC_{CC}$ and $SC_{Alb}$ for these hollow-fibre membranes.

TABLE 6

| Membrane from | Polyelectrolyte in the interior filler | $UFR_{Alb}$ ml/(h·m²·mmHg) | $SC_{ALB}$ | $SC_{CC}$ |
|---|---|---|---|---|
| Comparative example 6 | — | 20.7 | 0.012 | 0.640 |
| Example 6 | 0.5 wt. % of ACP 1005 | 20.6 | 0.003 | 0.930 |

The invention claimed is:

1. Method for producing a hydrophilic, water-wettable, semipermeable hollow-fibre membrane, comprising the following steps:
   a. preparing a homogeneous spinning solution comprising 12 to 30 wt. % of a synthetic first polymer and, if necessary, other additives in a solvent system,
   b. extruding the spinning solution through the annular slit of a hollow-fibre die to give a hollow fibre,
   c. extruding an interior filler through the central opening of the hollow-fibre die, the interior filler being a coagulation medium for the synthetic first polymer and comprising a solvent and a non-solvent for the synthetic first polymer,
   d. bringing the interior filler into contact with the inner surface of the hollow fibre to initiate coagulation in the interior of the hollow fibre and for formation of a separating layer on the inner surface of the hollow fibre and formation of the membrane structure,
   e. passing the hollow fibre through a coagulation bath to complete the formation of the membrane structure if necessary and to fix the membrane structure,
   f. extracting the hollow-fibre membrane thus formed, to remove the solvent system and soluble substances, and
   g. drying the hollow-fibre membrane, characterized in that the interior filler contains a polyelectrolyte with negative fixed charges, wherein the steps of the method are to be carried out in such a way that a hollow-fibre membrane possessing an open-pored integrally asymmetric structure across its wall, a porous separating layer of thickness between 0.1 and 2 μm on its inner surface facing a lumen, and an open-pored supporting layer is obtained with an ultrafiltration rate in albumin solution in the range of 5 to 23.5 ml/(h·m²·mmHg) and a maximum sieving coefficient for albumin of 0.005 combined with a sieving coefficient for cytochrome c that satisfies the following relation:

$$SCcc \geq 5 \cdot 10^{-5} \cdot UFR_{Alb}^3 - 0.004 \cdot UFR_{Alb}^2 + 0.1081 \cdot UFR_{Alb} 0.25.$$

2. Method according to claim 1, characterized in that the spinning solution also comprises 0.1 to 30 wt. % of a hydrophilic second polymer.

3. Method according to claim 1, characterized in that the synthetic first polymer is a hydrophobic first polymer and the spinning solution also comprises 0.1 to 30 wt. % of a hydrophilic second polymer.

4. Method according to claim 3, characterized in that an aromatic sulfone polymer such as polysulfone, polyethersulfone, polyphenylenesulfone or polyarylethersulfone, a polycarbonate, polyimide, polyetherimide, polyetherketone, polyphenylene sulfide, or a copolymer or mixture of these polymers is used as the hydrophobic first polymer.

5. Method according to claim 2, characterized in that polyvinyl-pyrrolidone, polyethylene glycol, polyvinyl alcohol, polyglycol monoester, polysorbate, carboxymethylcellulose, or a copolymer of these polymers is used as the hydrophilic second polymer.

6. Method according to claim 1, characterized in that the solvent system comprises a polar aprotic solvent.

7. Method according to claim 1, characterized in that the polyelectrolyte is selected from the group of polyphosphoric acids, polysulfonic acids, or polycarboxylic acids.

8. Method according to claim 7, characterized in that the polycarboxylic acids are homo- or copolymers of acrylic acid.

9. Method according to claim 1, characterized in that the proportion by weight of the polyelectrolyte is 0.01 to 1 wt. % relative to the weight of the interior filler.

* * * * *